United States Patent
Tanaka et al.

[11] Patent Number: 5,619,782
[45] Date of Patent: Apr. 15, 1997

[54] METHOD AND APPARATUS FOR INSERTING A MEMBER INTO A HOLE OF ANOTHER MEMBER

[75] Inventors: Katsuhisa Tanaka, Toyota; Akiyoshi Yamashita, Saito; Nobuyuki Akaishi, Toyota, all of Japan

[73] Assignee: Toyota Jidosha Kabushiki Kaisha, Toyota, Japan

[21] Appl. No.: 361,305

[22] Filed: Dec. 20, 1994

[30] Foreign Application Priority Data

Dec. 20, 1993 [JP] Japan .................................. 5-320485
Sep. 28, 1994 [JP] Japan .................................. 6-233341

[51] Int. Cl.⁶ .................................................. B23Q 17/00
[52] U.S. Cl. ........................ 29/407.1; 29/468; 29/281.4
[58] Field of Search .......................... 29/407.05, 407.09, 29/407.1, 468, 559, 281.4, 525

[56] References Cited

U.S. PATENT DOCUMENTS 3,824,674  7/1974  Inoyama et al. ..................... 29/407.05
4,884,329  12/1989  Higuchi ................................... 29/468

FOREIGN PATENT DOCUMENTS 39842    4/1981  Japan .................................. 29/281.4
89534    6/1982  Japan .................................. 29/281.4
105828   4/1992  Japan .................................. 29/525
470430   6/1992  Japan .
479024   7/1992  Japan .

OTHER PUBLICATIONS

Brief Description of "Insertion Manual For Inserting A Spool Into A Hole Having No Chamfer By Force Control".
Brief Description of "A Heuristic Method Using Fuzzy Reasoning To Precision Inserting Operation".

*Primary Examiner*—David P. Bryant
*Attorney, Agent, or Firm*—Cushman, Darby & Cushman IP Group of Pillsbury Madison & Sutro LLP

[57] ABSTRACT

A method and apparatus for inserting a first member into a hole of a second member includes the steps of (a) inclining either of the first member or the second member relative to the other and offsetting a center of the first member and a center of the hole, (b) moving the first member and the second member toward each other so that the first member and the second member contact each other at one point and are biased against each other, and (c) rotating either the first member or the second member about the contact point in a direction such that the center of the first member and the center of hole approach thereby inserting automatically the first member into the hole.

6 Claims, 11 Drawing Sheets

F I G. 7
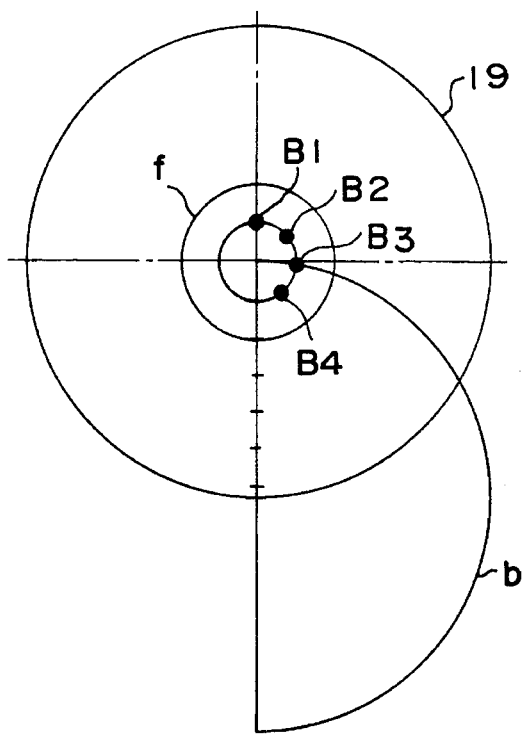
F I G. 8
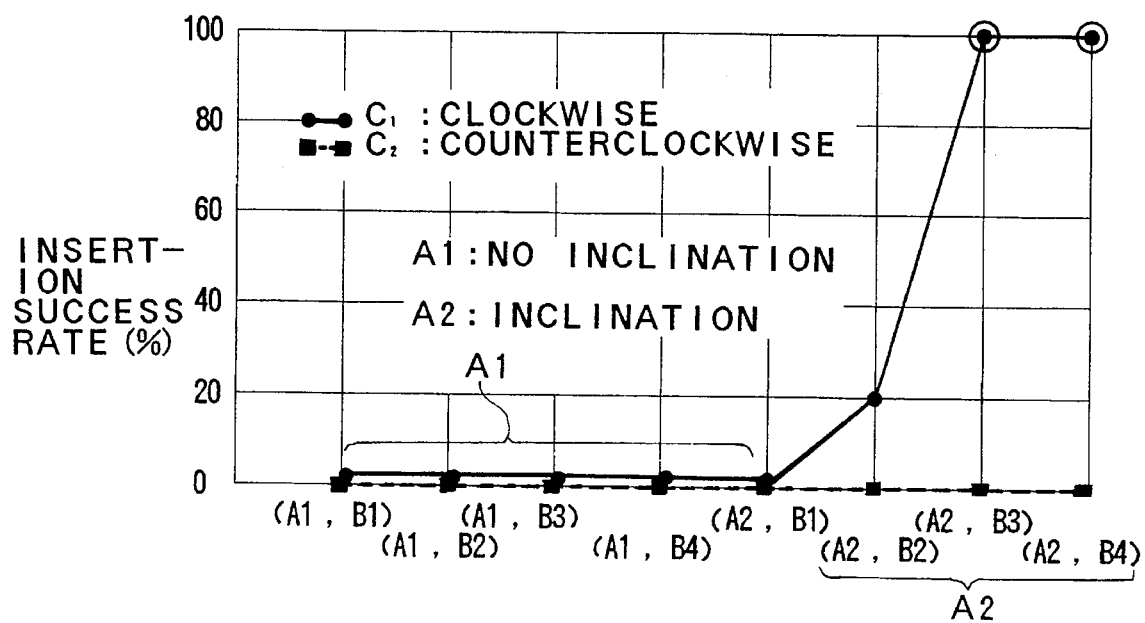

5,619,782

METHOD AND APPARATUS FOR INSERTING A MEMBER INTO A HOLE OF ANOTHER MEMBER

BACKGROUND OF THE INVENTION

1. Field of the Invention

The present invention relates to a method and apparatus for automatically inserting a first member (mounting member) having a cylindrical contour into a cylindrical hole of a second member (mounted member).

2. Description of the Prior Art

Japanese Utility Model Publication No. HEI-4-70430 discloses a conventional mounting member insertion method. In that method, a guide shaft having a chamfer is coupled to an arm of a robot. The guide shaft is inserted into a guide hole of a guide member which is parallel to the guide shaft prior to insertion. Such a method allows insertion without requiring chamfering of the mounting member and the mounted member.

However, there are the following problems with this prior art insertion method.

First, the method requires a special guide shaft and guide member for insertion.

Second, additional time must be expended while the robot searches for the guide hole.

Third, the control algorithm for searching for the guide hole is complicated and requires an expensive control apparatus.

Finally, chucking members may interfere with proper insertion because of indirect positioning by the guide shaft and guide member.

SUMMARY OF THE INVENTION

An object of the invention is to provide a method and apparatus for inserting a first member into a hole of a second member without using auxiliary means such as the above-described guide shaft and guide member. It is a further object of the present invention to eliminate the relatively long time period required for searching for the hole.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which:

FIG. 7 is an enlarged schematic plan view of test conditions corresponding to various positions of the center of the first member;

FIG. 8 is a graph illustrating the relationship between the insertion success rate and the center of the first member in accordance with the positions of FIG. 7;

DETAILED DESCRIPTION OF THE PREFERRED EMBODIMENTS

Figure 20:
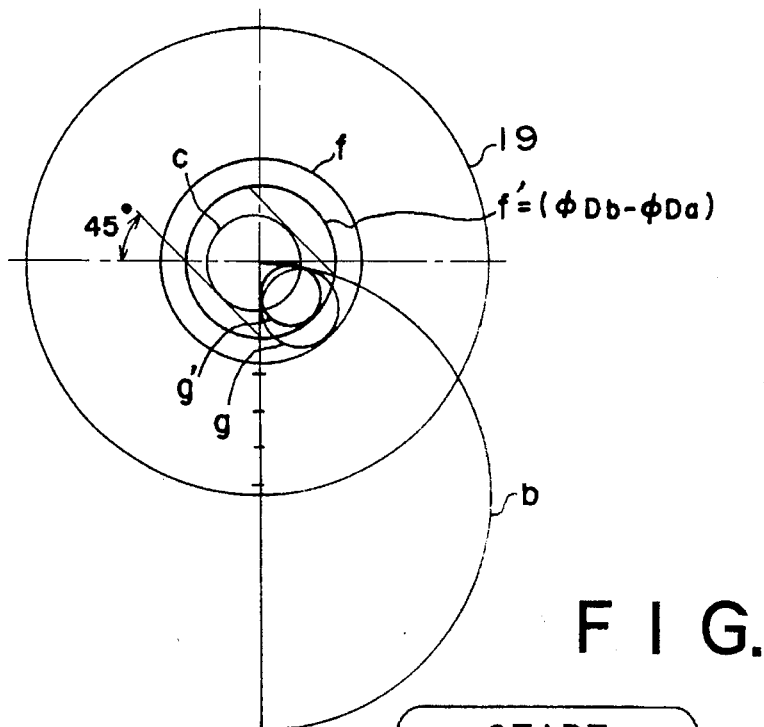
FIG. 20 is a plan view of the stepped hole of the second member illustrating an area (g') and an area (c)
Figure 21:
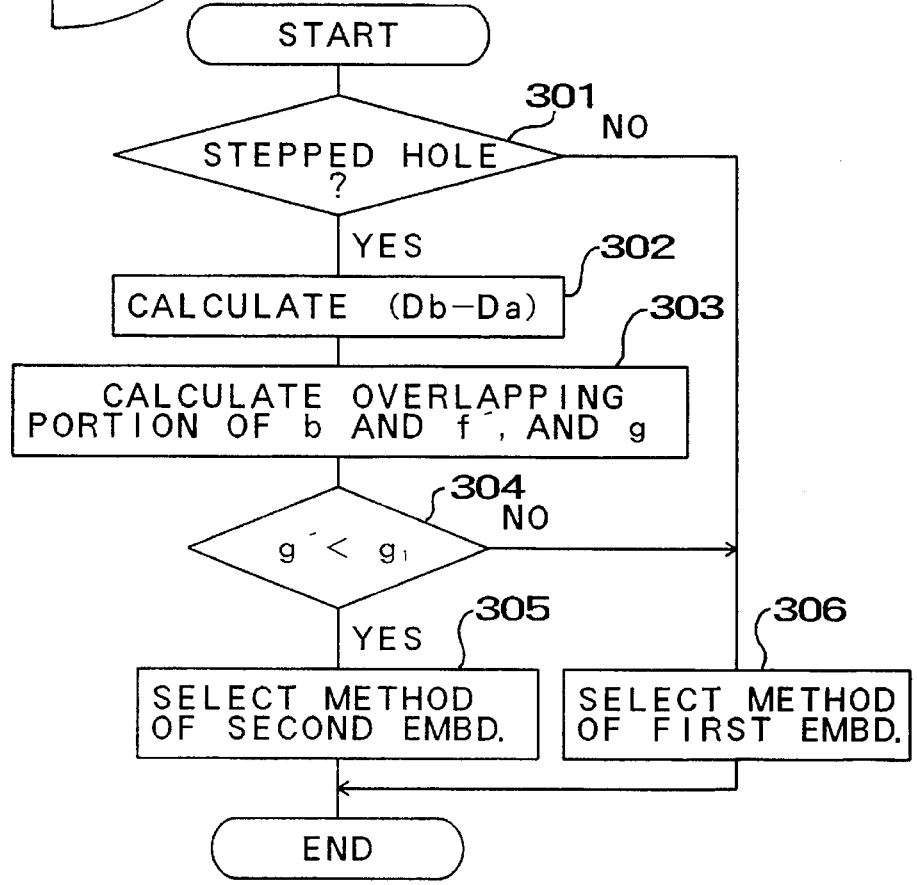
FIG. 21 is a flow chart illustrating an insertion and selection method in accordance with a third embodiment of the present invention.

FIGS. 1–13 illustrate a first embodiment of the present invention wherein a first member is inserted into a straight hole. FIGS. 14–20 illustrate a second embodiment of the present invention wherein a first member is inserted into a stepped hole. Finally, FIG. 21 illustrates a third embodiment of the present invention in which a selection method selects between the method according to the first embodiment and the method according to the second embodiment when a hole is stepped. Common structural portions throughout all of the embodiments of the present invention are denoted with the same reference numerals.

First, structure of the apparats and steps of the method common to all of the embodiments of the present invention will be explained with reference to FIGS. 1, 2 and 10 to 13.

Figure 1:
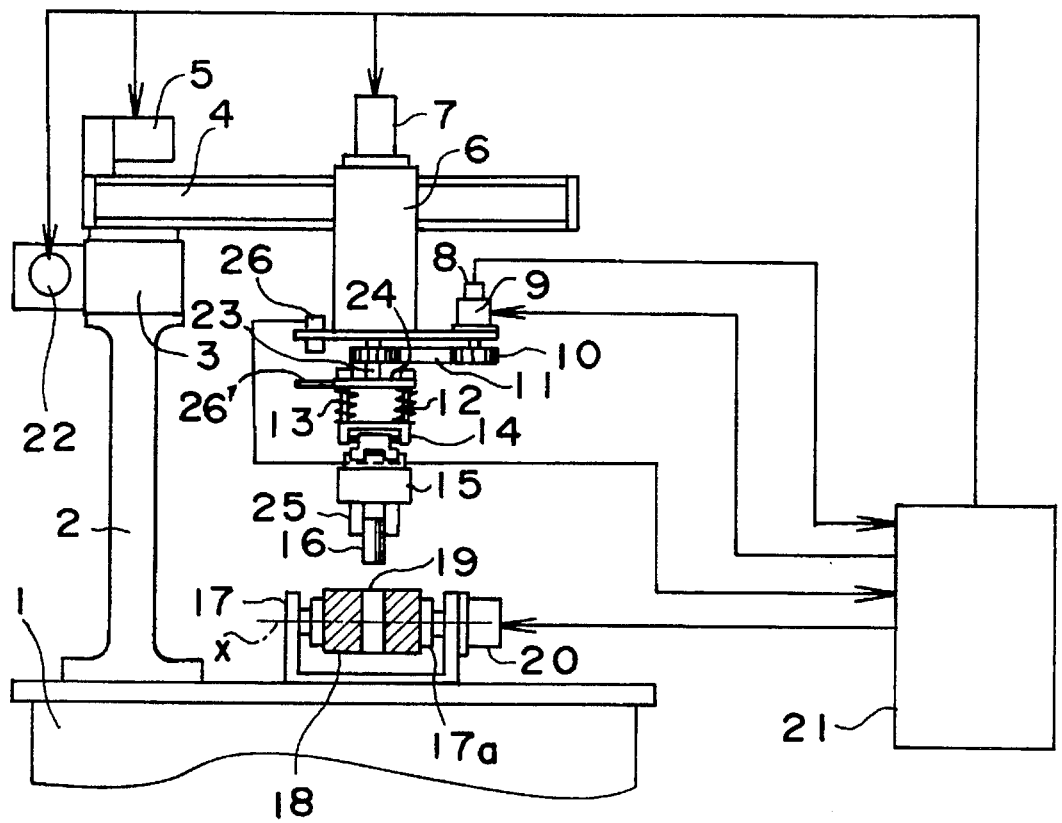
FIG. 1 is a front elevational view of an apparatus for inserting a first member into a hole of a second member in accordance with a first embodiment of the present invention.
Figure 2:
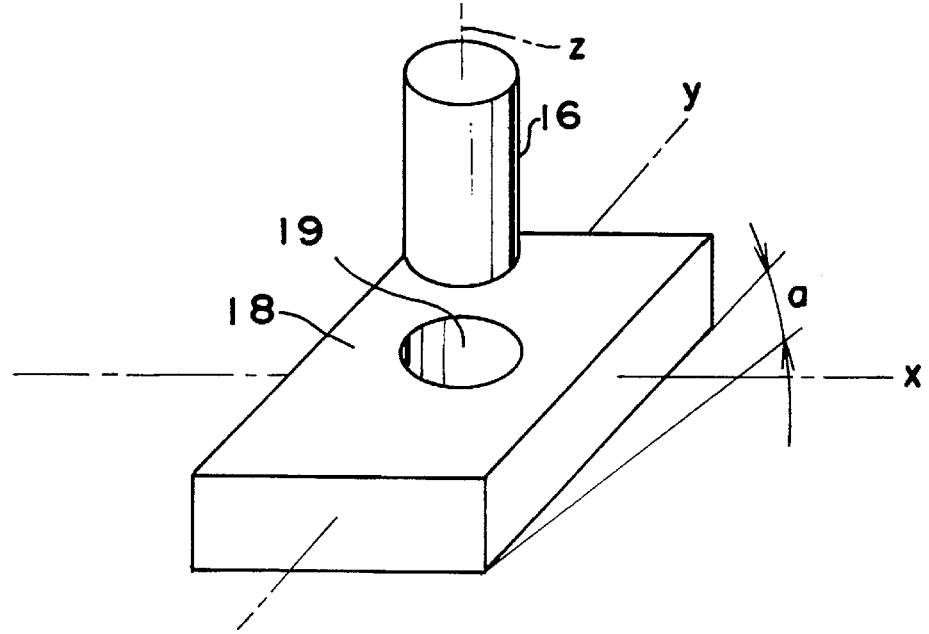
FIG. 2 As an oblique view of the first member and the second member of FIG. 1.
Figure 3:
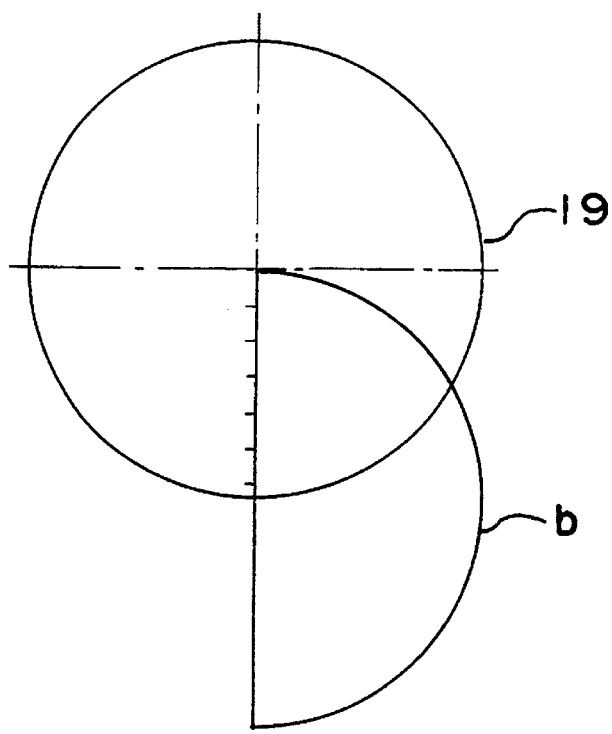
FIG. 3 is an enlarged schematic plan view of the hole of the second member and an area (b) in which the center of the first member should be located before insertion.

As illustrated in FIG. 1, a robot is mounted to an upper portion of a support 2 fixed to a base 1. The robot has a wrist member 23 which can be moved to any position within a three-dimensional accessible space. Such a space, as shown in FIG. 2, is defined relative to three orthogonal axes x, y, and z. Servo actuators 22, 5, and 7 drive the wrist member 23 in directions along axes x, y, and z, respectively. A multi-articulation robot having three or more articulations may replace the robot of FIG. 1.

The wrist member 23 is rotatable about an axis of the wrist member 23 by an actuator 9 attached to the robot member 6 and coupled to the wrist member 23 via a pulley 10 and a belt 11. Rotation of the wrist member 23 is detected by a rotation sensor 8 (for example, a potentiometer) coupled to the actuator 9.

A first member 16 (mounting member) has a cylindrical contour. Such a member might be, for example, a spool to be inserted into a valve hole. A chuck 15 chucks the first member 16 by a pair of fingers 25 movable inwardly to hold and outwardly to release the first member 16. The fingers 25 are driven by a driving mechanism housed in a case of the chuck 15.

Figure 10:
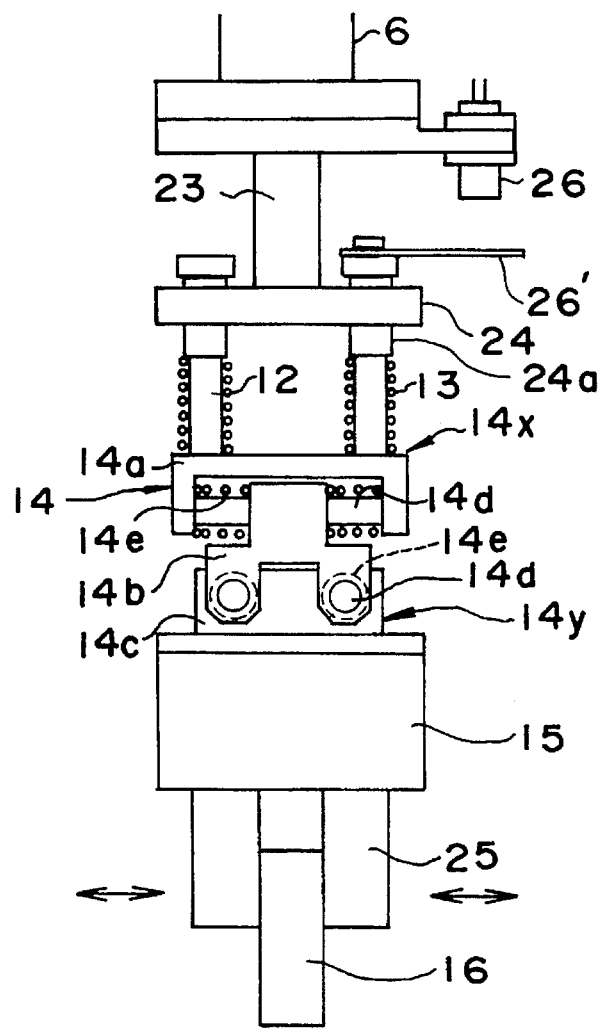
FIG. 10 is an enlarged front elevational view of a floating mechanism of FIG. 1 and the apparatus near the floating mechanism.
Figure 11:
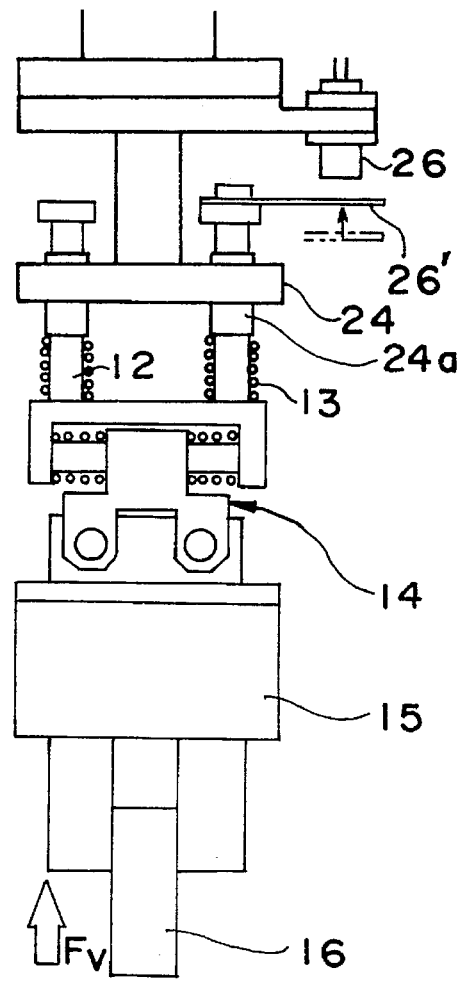
FIG. 11 is a front elevational view of the floating mechanism of FIG. 10 when a vertical load acts on the floating mechanism.
Figure 12:
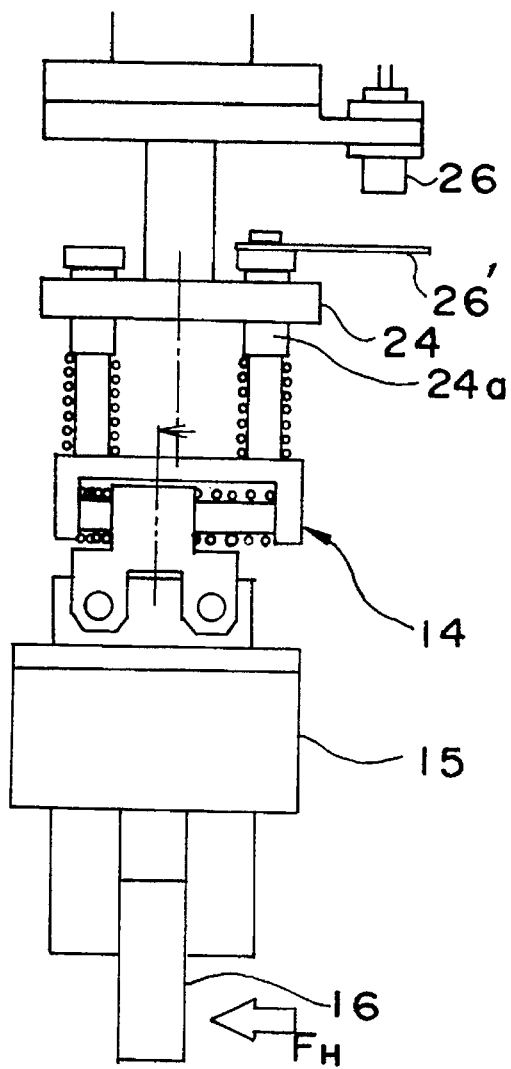
FIG. 12 is a front elevational view of the floating mechanism of FIG. 10 when a horizontal load acts on the floating mechanism.

A floating mechanism 14 is disposed between the wrist member 23 and the chuck 15 and allows the chuck 15 to move relative to the wrist member 23 in directions (X-Y directions) perpendicular to the axis of the wrist member 23. As illustrated in FIG. 10, the floating mechanism 14 includes an X-direction floating portion 14x and a Y-direction floating portion 14y assembled in series. The floating portion 14x includes two members 14a and 14b movable relative to each other. Member 14b is supported slidably on member 14a by two parallel shafts 14d fixed between extension portions of member 14a. Springs 14e are disposed along shafts 14d and between the two members 14a and 14b.

Figure 13:
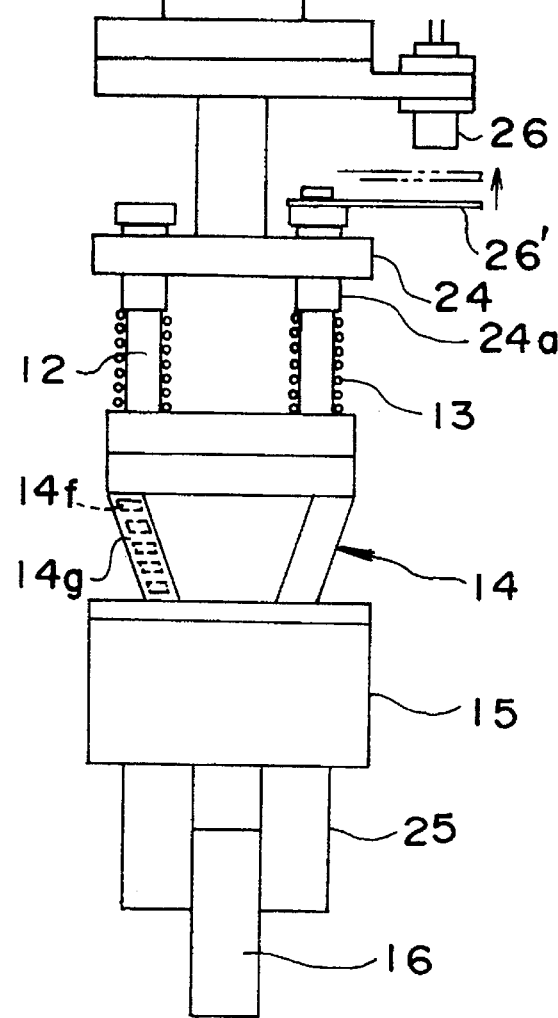
FIG. 13 is an enlarged front elevational view of a substitute floating mechanism for the floating mechanism of FIG. 1.

Similarly, the floating portion 14y includes two members 14b and 14c movable relative to each other. Member 14c is supported slidably on member 14b by two parallel shafts 14d fixed between extension portions of member 14b. Springs 14e are disposed along the shafts 14d and between the two members 14b and 14c. Any suitable floating mechanism may be substituted for the X-Y floating mechanism if such a floating mechanism allows the chuck 15 to move relative to the wrist member 23 in the directions perpendicular to the axis of the wrist member 23. An example of an acceptable substitute is the so-called RCC (Remote Center Compliance) device shown in FIG. 13. In FIG. 13, the RCC device 14 includes a rubber member 14g and a plurality of rigid plates 14f embedded in the rubber member 14g. The apparatus of FIG. 1 includes the mechanism of FIG. 10.

Disposed between the X-Y floating mechanism 14 and either the wrist member 23 or the chuck 15 is a biasing member 13 (for example, a coil spring) that biases the chuck 15 away from the wrist member 23. For example, a plate 24 extending in a direction perpendicular to the axis of the wrist member 23 can be fixed to the wrist member 23. Two bushings 24a are fixed to the plate 24. Two guide pins 12 extending upwardly from the floating mechanism 14 slidably extend through the bushings 24a. Coil springs 13 disposed between the bushings 24a and the floating mechanism 14 bias the floating mechanism away from the wrist member 23. This structure provides a Z-direction floating mechanism that supports the chuck 15 and allows the chuck 15 to move in the vertical direction relative to the wrist member 23.

A displacement sensor 26 fixed to the robot 6 detects vertical displacement of the chuck 15 relative to the wrist member 23. A plate 26' which moves with the chuck 15 extends to a position opposite the sensor 26. The sensor 26 detects the distance between the sensor 26 and the plate 26'.

Referring again to FIG. 1, a jig 17 fixed to the base 1 supports and inclines a second member 17 (mounted member, for example, a valve body). The second member 18 has a cylindrical hole 19 into which a first member 16 (mounting member) is inserted. The holder 17a and consequently the second member 18 are rotatable about the x-axis by a rotary actuator 20. As illustrated in FIG. 2, an axis of the hole 19 of the second member 18 can be inclined from a vertical position through a small angle a (for example, 0–5 degrees) by the rotary actuator 20. If a six-articulation robot is used as the robot for moving the first member, the wrist of the six-articulation robot can be inclined relative to the second member 18. Therefore, the rotary actuator 20 is unnecessary to incline the second member.

The output signals of the rotation sensor 8 and the displacement sensor 26 are fed to a control apparatus 21 and analyzed. Therefore, an insertion specification including appropriate output signals is determined by the control apparatus 21. The output signals are fed to the servo actuators 22, 5, and 7 of the robot, to the rotary actuator 20, and to the actuator 9 to position the robot, rotate the second member 18, and rotate the wrist member 23, respectively.

The steps of the insertion method common to all of the embodiments of the present invention will now be explained with reference to FIGS. 1–13.

Figure 4:
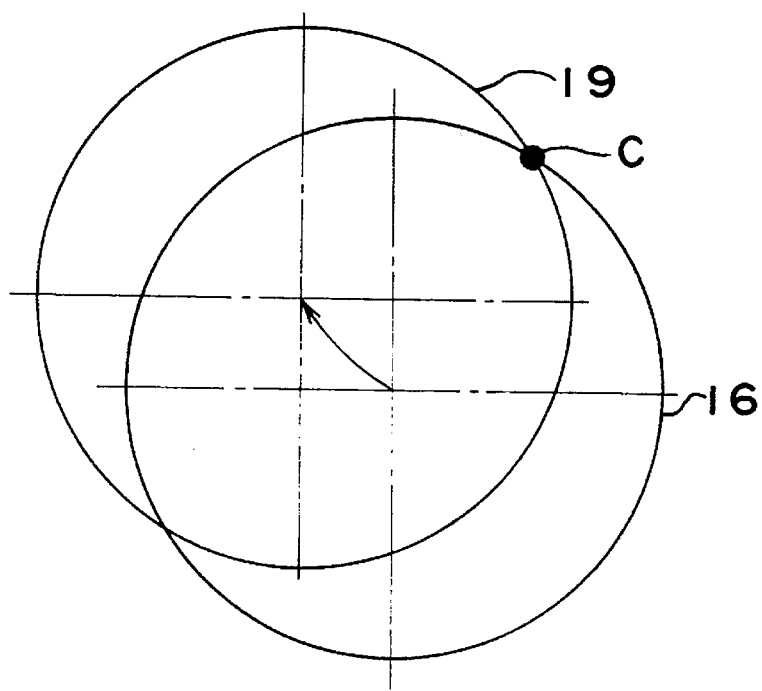
FIG. 4 is an enlarged schematic plan view of the first member and the hole of the second member including a contact point (C) between the first member and a periphery of the hole of the second member.

First, the second member 18 is held by the jig 17 such that the hole 19 is positioned in the vertical direction. Next, the first member 16 is chucked within the chuck 15 and is conveyed to a position above the hole 19 by operating the robot such that the axis of the first member 16 is directed in the vertical direction. As shown in FIG. 4, the axes of the hole 19 and the first member 16 are parallel with and offset from each other.

To ensure that the first member 16 is coaxial with the hole 19 using the method of the present invention, the center of the first member 16 should be located in a semi-circular area b (centering capable area, see FIGS. 3 and 6) such that the axis of member 16 is offset from the axis of hole 19. The area b is defined as an area surrounded by the y-axis and a semi-circle having the same radius as the hole 19 and a center at an intersection point (a lower point of two intersection points staggered when either the first member or the second member is inclined relative to the other) located at the intersection of the periphery of the hole 19 with the y-axis. When the first member 16 is rotated in a clockwise direction relative to the second member 18, the semi-circular area b appears in the fourth quadrant. When the first member 16 is rotated in a counterclockwise direction relative to the second member 18, the semi-circular area b appears in the third quadrant.

In the next step, either the first member 16 or the second member 18 is inclined relative to the other by a small angle. In the embodiment shown in FIG. 2, the second member 18 is inclined by the rotary actuator 20, and the axis of the hole 19 is inclined from the vertical by angle a. FIG. 2 shows the second member 18 inclined. The above-described offsetting and inclining may be performed in any order.

Then, either the first member 16 or the second member 18 is moved toward the other so that the first member 16 and the second member 18 contact each other at one point and are pressed against each other. In the embodiment shown in FIG. 1, the first member 16 is moved toward the second member 18 by operating the servo actuator 7. The periphery of a tip portion of the first member 16 contacts a periphery of an open end of the hole 19 of the second member 18 at one point. The two peripheries contact only at one point because the periphery of the hole 19 is inclined relative to the periphery of the tip of the first member 16. Designation C in FIG. 4 shows this contact point.

Thereafter, moving further the wrist member 23 toward the second member 18 after the first member 16 begins to contact the second member 18 compresses the biasing member 13 (a rubber member 14g in the embodiment of FIG. 13) so that the first member 16 and the second member 18 are biased against each other. This biasing produces an insertion force $F_V$ see FIG. 11) that automatically inserts the first member 16 into the hole 19 when the first member 16 and the hole 19 are coaxial. The biasing force also produces a necessary friction force at the contact point C so that rotation of the first member 16 and the second member 18 remains centered at point C when either the first member 16 or the second member 18 is rotated relative to the other.

As suggested, either the first member 16 or the second member 18 is rotated relative to the other about the contact point C in a direction such that the axis of the hole 19 and the axis of the first member 16 approach each other. In the embodiment shown in FIGS. 4 and 5, the first member 16 is rotated relative to the second member 18 in the clockwise direction by the rotation of the wrist member 23. The wrist member 23 is rotated by the torque transmitted from the actuator 19 by the pully 10 and the belt 11. At the same time, a horizontal force $F_H$ acts on the floating mechanism 14 (see FIG. 12) deforming it.

Figure 5:
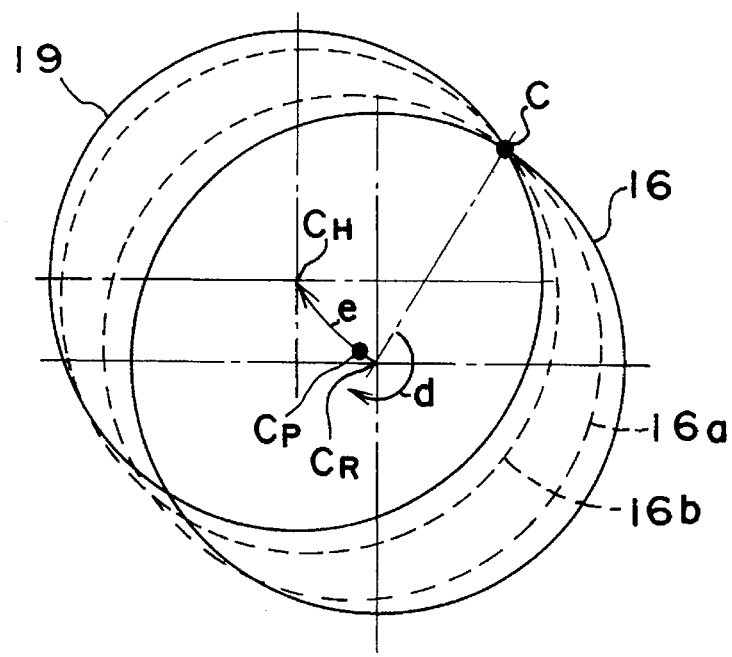
FIG. 5 is an enlarge schematic plan view of the first member and the hole of the second member illustrating the positional relationship between the first member and the hole of the second member when the first member is rotated about the contact point (C)

Specifically, as illustrated in FIG. 5, center $C_R$ of the wrist member 23 and center $C_H$ of the hole 19 are offset initially from each other. When a torque d (see FIG. 5) is transmitted via the floating mechanism 14 to the first member 16, the center $C_P$ of the first member 16 rotates about point C without slipping because of the friction at point C resulting from the deformation of the floating mechanism 14. The center $C_P$ approaches center $C_H$ of the hole 19 along the locus e (see FIG. 5). Finally, when center $C_H$ of the first member 16 substantially coincides with center $C_H$ of the hole 19, the tip portion of the first member 16 is automatically inserted into the hole 19 by the force of the biasing member 13 (the rubber member 14g in the embodiment of FIG. 13). Simultaneously with the insertion, both the chuck 15 and the plate 26' lower. Upon insertion, the plate 26' moves relative to the sensor 26. By sensing the lowering of the plate 26', the automatic insertion of the first member 16 into the hole 19 is detected. Thereafter, the servo actuator 7 further drives the first member 16 to a desired position in the hole 19.

Finally, the first member 16 is released, and the chuck 15 is moved upward by the servo actuator 7 together with the wrist member 23. The second member 18 is dismounted from the jig 17, and the insertion work is finished.

When the inclination of the second member 18 is small and the first member 16 is short, the first member 16 remains inclined relatively during the entire insertion procedure. However, when the inclination of the second member 18 is large and the first member 16 is long, the first member 16 remains inclined only during an early stage of the insertion procedure and should be returned to its relative vertical position at a later stage of the insertion procedure.

Figure 6:
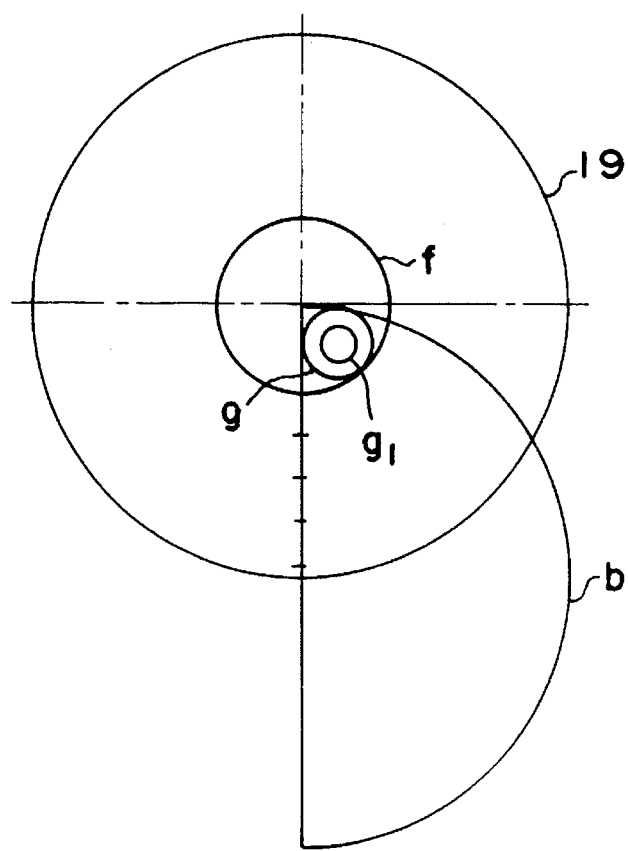
FIG. 6 is an enlarged schematic plan view of the first member and the hole of the second member illustrating the acceptable positional area in which the center of the first member should be located prior to insertion.

As illustrated in FIG. 6, a centering capable area b, as defined above, is restricted by a followable area f of the X-Y floating mechanism 14. More particularly, in order to rotate the first member 16 about point C without slippage, the frictional force (determined by the frictional coefficient and the biasing force) at point C should be larger than the reaction force generated by the biasing mechanisms of the X-Y floating mechanism 14 when the first member 16 is rotated about point C. Yet, the larger the distance between the centers of the first member 16 and the hole 19, the larger the reaction force is. Thus, when the center $C_P$ is within the area f, the condition requiring that the frictional force be larger than the reaction force is satisfied. Therefore, a condition requiring that an overlapping portion of area f and area b be larger than a positioning error area $g_1$ should be satisfied. The followable area f of the floating mechanism 14 is determined so that this condition is satisfied. In other words, the first member 16 should be conveyed by the robot such that the center $C_P$ of the first member 16 comes to a position within the overlapping portions of area f and area b, and the control profile must be selected such that area f encompasses area $g_1$. When area f is fixed, area $g_1$ should be smaller than area g—an area defined by a circle contacting the outside contour of area b and the area f from the inside. In other words, area g represents the maximum available area for area $g_1$.

To confirm that the first member could be inserted smoothly into the hole of the second member, tests were conducted. FIG. 7 shows the test conditions, and FIG. 8 shows the test results. Locations B1, B2, B3, and B4 representing the center of the first member 16 were used during the test. As shown in FIG. 7, locations B1 and B2 were placed outside the centering capable area b and locations B3 and B4 were placed in the overlapping portion of the centering capable area b and the followable area f. Tests were conducted in two conditions. In the first condition (condition A1), the second member 18 was not inclined relative to the first member 16. In the second condition (condition A2), second member 18 was inclined relative to the first member 16. As seen from FIG. 8, in condition A1, the first member 16 could not be inserted into the hole 19 at any location B1, B2, B3, B4. In condition A2, the first member 16 could be inserted into the hole 19 at locations B3 and B4 when the first member 16 was rotated in a clockwise direction ($C_1$) such that the center of the first member 16 approached the center of the hole 19. Even in condition A2, the first member could not be inserted into the hole 19 when rotated about locations B1 and B2. Condition A2 and location B3 and condition A2 and location B4 are within the scope of the present invention.

Figure 9:
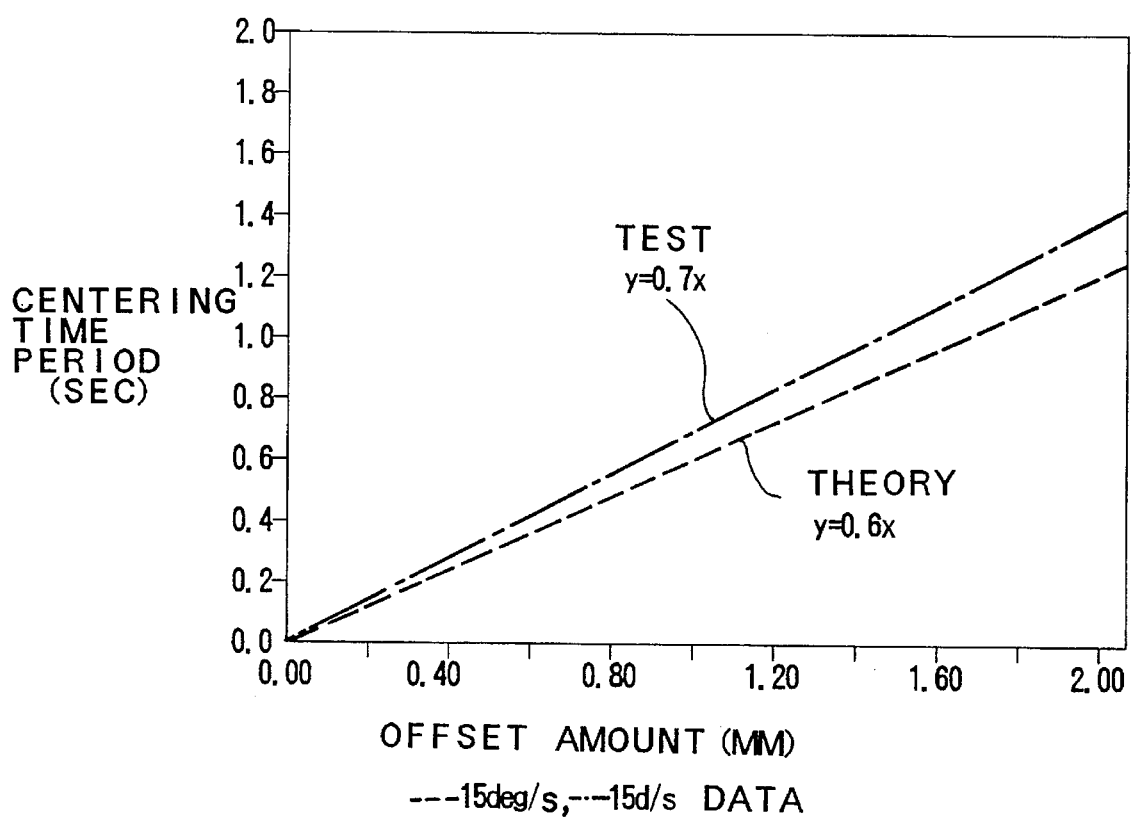
FIG. 9 is a graph illustrating the relationship between the time needed for insertion and an offsetting amount.

Additionally, tests for investigating the time required to center the first member 16 were conducted for various offsets between the center of the first member 16 and the center of the hole 19. Results are shown in FIG. 9. As seen from FIG. 9, when the offset was 0.5 mm, centering was completed in 0.4 secs. The test values compare well with the theoretical values calculated from the rotational speed of the wrist member 23. Consequently, the method according to the present invention does not require time to search for the center of the hole and, therefore, automatic centering and insertion are possible.

To ensure successful insertion, the control apparatus 21 calculates the theoretical time T needed for inserting the first member 16 into the hole 19. If the control apparatus 21 does not receive a signal from sensor 26 within a time T+alpha indicating that the insertion has been completed, the control apparatus 21 determines that some insertion trouble has occurred. Such trouble can be caused, when, for example, the diameter of hole 19 is machined to be smaller than the diameter of the first member 16 or when a burr is present at the periphery of the open end of the hole.

Next, the steps and structure unique to each embodiment of the present invention will be explained.

With the first embodiment of the present invention, as shown in FIGS. 1–13, the hole 19 has a constant diameter over the entire length of a hole portion where the first embodiment is to be inserted.

With the second embodiment of the present invention, as shown in FIGS. 14–20, the hole 19 is a stepped hole having a first hole portion 19a and a second hole portion 19b. The second hole portion 19b is located on the open side of the first hole portion 19a and has a diameter larger than the first hole portion 19a.

Figure 14:
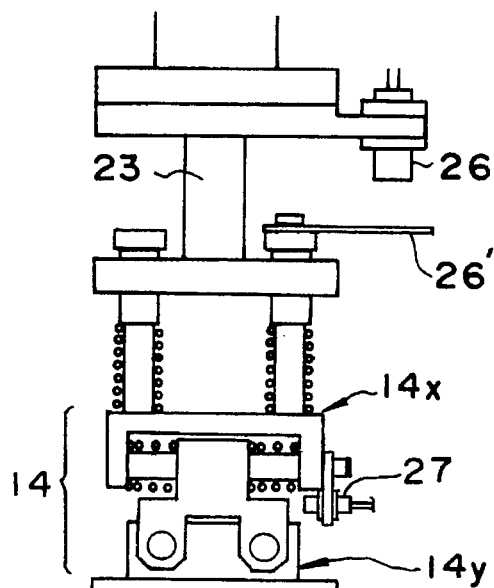
FIG. 14 is a partial front elevational view of an apparatus for inserting a first member into a stepped hole of a second member in accordance with a second embodiment of the present invention.
Figure 15:
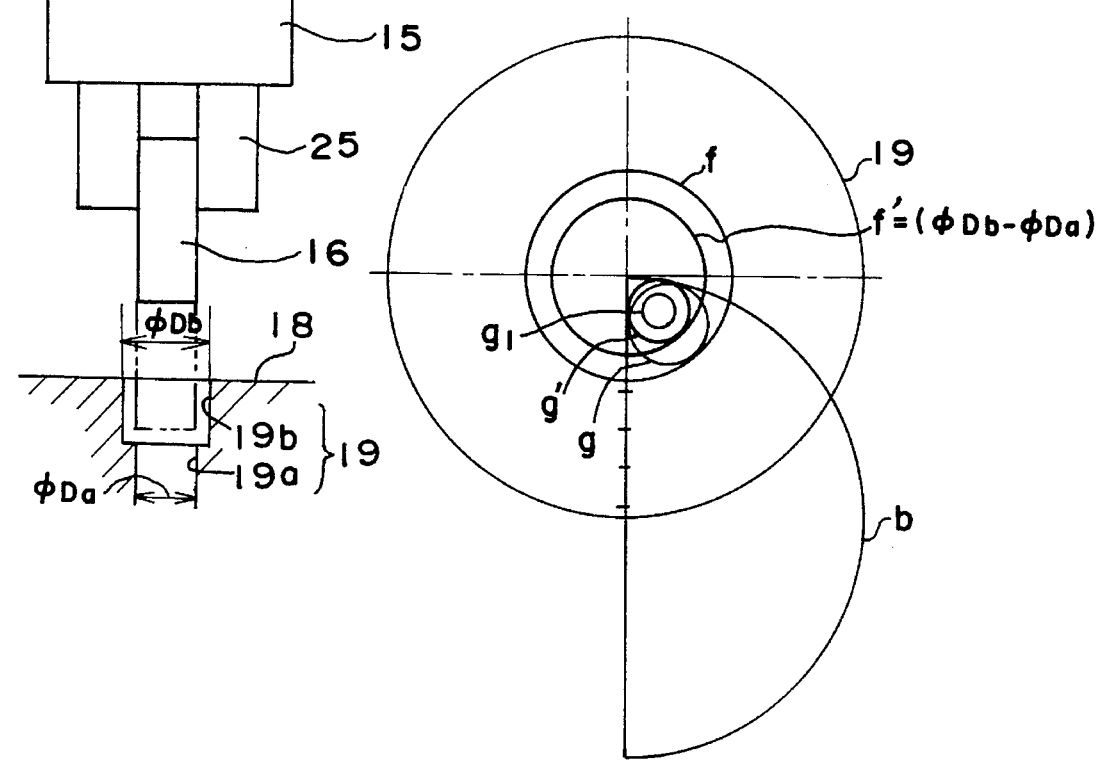
FIG. 15 is an enlarged plan view of the hole of the second member of FIG. 14 illustrating a relationship among dimensions f, f', g, g', $g_2$, $b_1$, Db, and Da.
Figure 16:
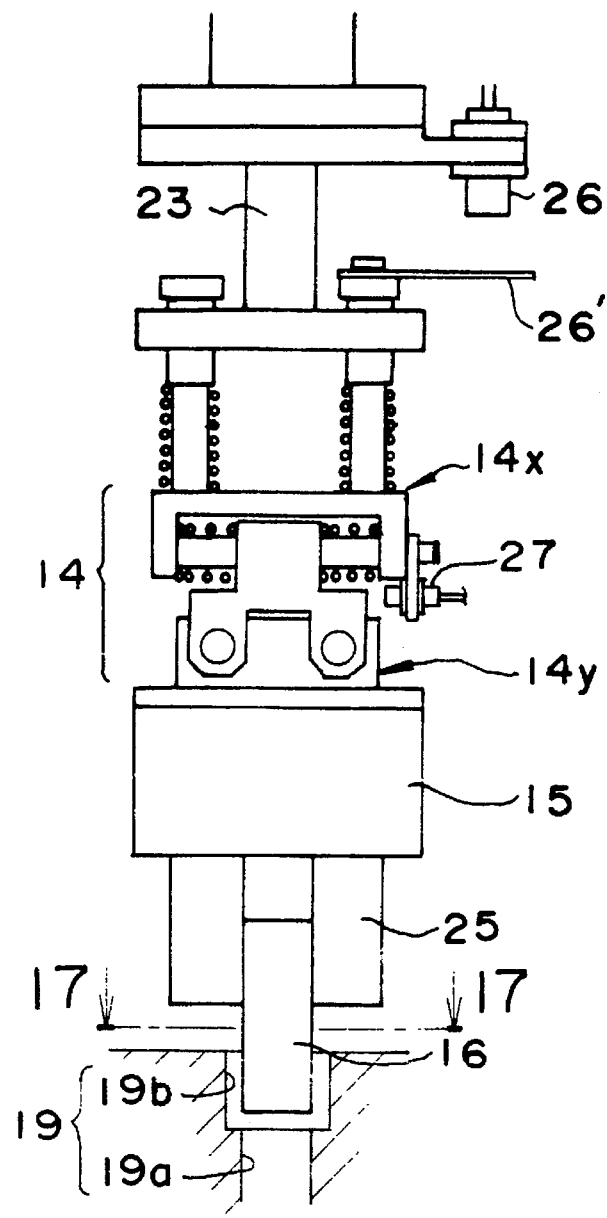
FIG. 16 is a partial front elevational view of the apparatus of FIG. 14 in a state where the first member is inserted into a second hole portion of the stepped hole of the second member.

In the apparatus according to the second embodiment of the invention, as illustrated in FIG. 14, a displacement sensor 27 fixed to the floating mechanism 14 detects the displacement (x in FIG. 18) of the chuck 15 relative to the wrist member 23 in a direction perpendicular to the axis of the wrist member 23. When the wrist member 23 is rotated, the chuck 15 is rotated as well. Then, when the first member 16 contacts the inside surface of the second hole portion 19b, rotation of the chuck 15 stops. More particularly, when the first member 16 rotates, the floating mechanism is displaced. The sensor 27 detects the displacement indicating that the first member 16 has contacted the inside surface of the second hole portion 19b.

In the method according to the second embodiment of the present invention, the first member 16 is inserted into the first hole portion 19a after insertion into the second hole portion 19b. If, however, the first member 16 were inserted directly into the first hole portion 19a according to the method of the first embodiment of the present invention, the rid of the first member 16 might interfere with the periphery of the open end of the second hole portion 19b.

To ensure that the tip of the first member 16 does not interfere with the second hole portion 19b, an insertion capable area g for the center of the first member 16 is limited to a maximum area g'. The area g' is defined as the circular area between the y-axis, the outer contour of area b, and the circle f'. The circle f' is a circle having a diameter equal to the difference between the diameter Da of the first hole portion 19a and the diameter Db of the second hole portion 19b and coaxial with the area f. A circle $g_1$ having a radius equal to a tolerance intrinsic to the apparatus should be within area g'. When the diameter differential (Db-Da) and, consequently, the area g are small, the tolerance of the apparatus should be; small. In other words, the positioning accuracy of the apparatus must be high. Therefore, the cost of insertion increases.

The method of the second embodiment of the present invention aims to increase the size of the maximum insertion capable area g'. More particularly, the method of the second embodiment increases the size of the maximum insertion capable area from g' to c, as shown in FIG. 20. Consequently, the needed positional accuracy is lowered.

To reduce the positional accuracy requirement, steps are added to the method of the first embodiment prior to inclination of the first member 16 or the second member 18. Those additional steps include: (a) inserting the first member 16 into the second hole portion 19b (see FIGS. 16 and 17) and (b) moving either the first member 16 or the second member 18 relative to the other in a direction transverse to the stepped hole 19 so that the side surface of the first member 16 and the inside surface of the second hole portion 19b contact (see FIG. 18). When the first member 16 contacts the inside surface of the second hole portion 19b, the axis of the first member 16 and the axis of the first hole portion 19a are offset.

Figure 17:
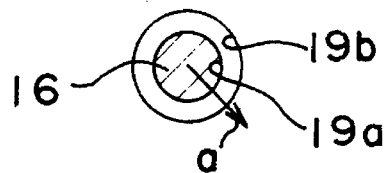
FIG. 17 is a cross-sectional view of the apparatus of FIG. 16 taken along line 17—17.
Figure 18:
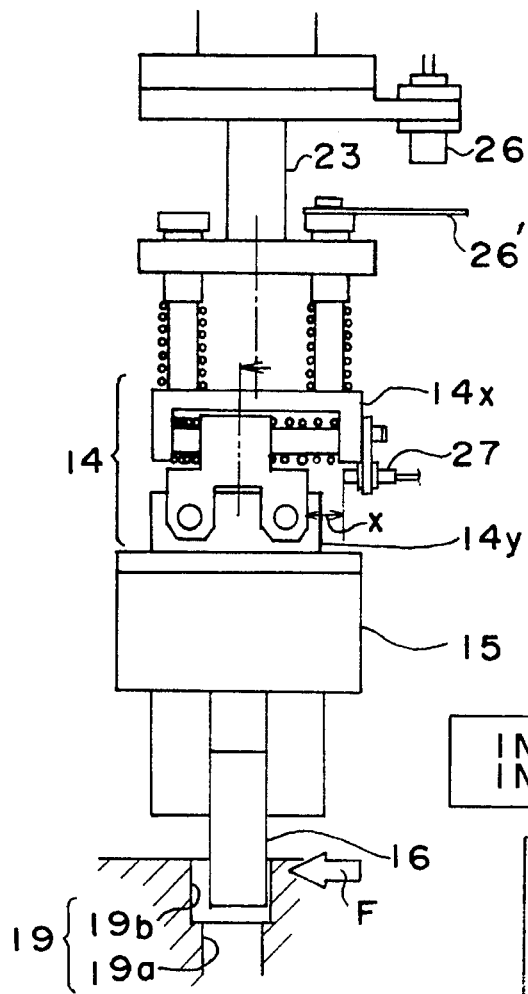
FIG. 18 is a partial front elevational view of the apparatus of FIG. 14 in a position where the first member contacts an inside surface of the second hole portion of the stepped hole of the second member.

Thereafter, when the first member 16 continues to be moved past the point of contact in the direction a, as shown in FIG. 17, the floating mechanism 14 is displaced thereby increasing the distance x shown in FIG. 18. The displacement sensor 27 detects the change in the distance x indicating that the first member 16 has contacted the inside surface of the second hole portion 19b. Upon receiving the contact signal from the sensor 27, the robot stops movement of the wrist member 23 in the horizontal direction. Next, the first member 16 is inserted into the first hole portion 19a according to the method of the first embodiment of the present invention.

Figure 19:
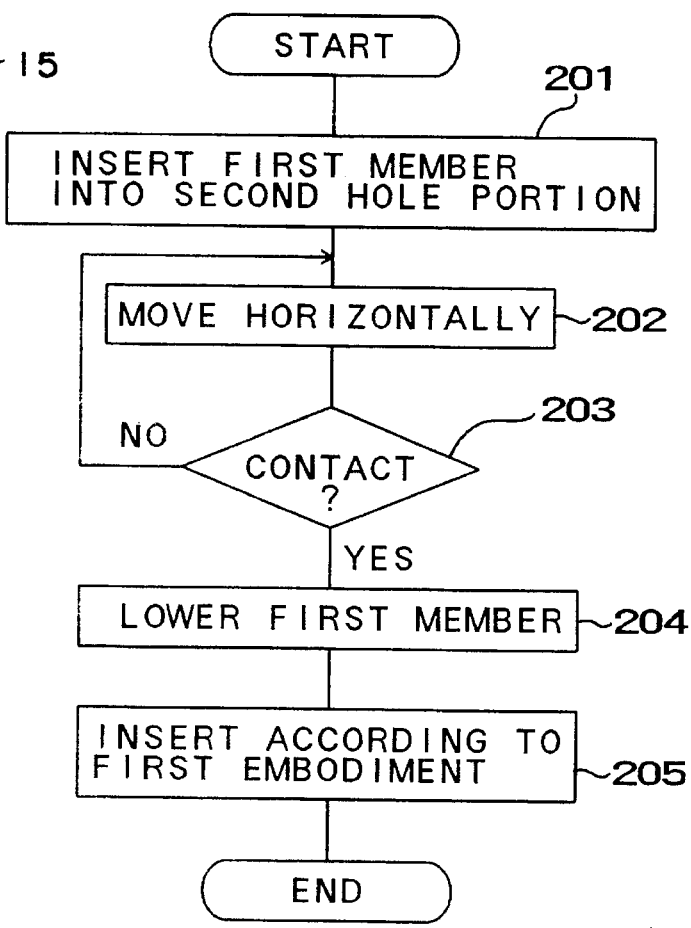
FIG. 19 is a flow chart of a method for inserting the first member into the stepped hole of the second member in accordance with the second embodiment of the present invention.

FIG. 19 illustrates a flow chart of the above-described steps. At step 201, the first member 16 is inserted into the second hole portion 19b to a middle position of the second hole portion 19b by driving the robot to move the wrist member 23. Then, at step 202, the first member 16 is moved perpendicularly to the axis of the stepped hole 19 in a linear direction 45° from X-axis (see direction a in FIG. 17). The 45° angle is selected because the diameter of the circular area c is maximized when that angle is equal to about 45°. This movement is continued until the first member 16 contacts the inside surface of the second hole portion 19b and is detected by the sensor 27 at step 203. Then, at step 204, the first member 16 is moved toward the first hole portion 19a until the first member 16 contacts the periphery of the open end of the first hole portion 19a. Then, at step 205, the first member 16 is inserted into the first hole portion 19a according to the method of the first embodiment of the invention.

The reason why circular area g' is increased to circular area c will be explained with reference to FIG. 20. Two parallel lines inclined by 45° (i.e. parallel to the direction of movement of the first member 16) are drawn so as to pass through the intersections of circle f' with the outside edge of the semi-circular area b and circle f' with the y-axis. Circular area c is drawn between the parallel lines and centered at the center of the stepped hole 19.

The first member 16 is inserted into the second hole portion 19b such that the center of the first member 16 is located within area c. Then, the first member 16 is moved horizontally at a 45° angle until it contacts the inside surface of the second hole portion 19b. When the first member 16 contacts the inside surface of the second hole portion 19b, the center of the first member 16 is located on a portion of circle f' (an arc) located in the quadrant containing the semi-circular area b.

Consequently, the center of the first member 16 can be located within circular area c when the first member 16 is inserted into the second hole portion 19b. In contrast, insertion of the first member 16 into the first hole portion 19a according to the method of the first embodiment requires that the center of the first member 16 be within area g'. Yet, area g' is increased to area c in the second embodiment. Therefore, the maximum positioning tolerance $g_1$ of the apparatus is relaxed from g' (corresponding to the first embodiment of the present invention) to c in the second embodiment. As a result, the manufacturing cost of insertion is decreased.

Although in the above explanation the area c is circular, the area where the center of the first member 16 should be located during insertion may be increased from the circular area c to an area surrounded by the two parallel lines and the circle f'.

The third embodiment of the present invention provides a method for selecting between the method of the first embodiment and the method of the second embodiment when the hole 19 is stepped. FIG. 21 illustrates the steps of the method according to the third embodiment of the present invention.

At step 301, a decision is made whether the hole 19 is a stepped hole. If hole 19 is not stepped, the routine proceeds to step 306 where the method according to the first embodiment is performed. If hole 19 is stepped, the routine calculates the differential diameter (Db-Da) between the first hole portion 19a and the second hole portion 19b in step 302. Then, at step 303, an insertion capable area is determined. This insertion capable area corresponds to the area formed by the overlap of circle f', semi-circular area b, and the y-axis, as shown in FIG. 20. Then, the routine proceeds to step 304 where a decision is made whether circle $g_1$, representing the positioning tolerance of the apparatus, is within the maximum insertion capable area g'. If the area g' is encompassed by circle $g_1$, the routine proceeds to step 305 whereby the area is increased to area c and the first member 16 is inserted into the hole 19 according to the method of the second embodiment of the present invention. If the area g' coincides with or is larger than circle $g_1$, the routine proceeds from step 304 to step 306 whereby the first member 16 is inserted into the hole 19 according to the method of the first embodiment of the present invention.

In the third embodiment of the present invention, it is allowed to select between the method of the first embodiment and the method of the second embodiment based on the differential diameter Db-Da between the first hole portion 19a and the second hole portion 19b.

Although only a few embodiments of the present invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A method for inserting a first member having a cylindrical contour into a cylindrical hole of a second member comprising the steps of:

(a) inclining one of the first member and the second member relative to the other of the first member and the second member by a small angle, and offsetting one of a center of a tip of the first member and a center of the hole of the second member from the other of the center of the tip of the first member and the center of the hole of the second member;

(b) moving one of the first member and the second member toward the other of the first member and the second member in an axial direction of the hole of the second member so that one of a periphery of the tip of the first member and a periphery of an open end of the hole of the second member contacts the other of the periphery of the tip of the first member and the periphery of the open end of the hold of the second member at one point, and biasing one of the first member and the second member against the other of the first member and the second member; and (c) rotating one of the first member and the second member relative to the other of the first member and the second member about said one point in a direction such that one of the center of the tip of the first member end and the center of the hole of the second member approaches the other of the center of the tip of the first member and the center of the hole of the second member, until the first member is automatically inserted into the hole of the second member when the centers are substantially aligned.

2. A method according to claim 1, wherein during said offsetting, the center of the tip of the first member is brought to a position in an overlapping portion of a followable area f and a centering capable area b, the followable area f comprising a circular area coaxial with the hole, and the centering capable area b comprising a semi-circular area surrounded by (a) a y-axis, in which direction one of the first member and the second member is inclined, and (b) a semi-circle having a radius equal to the radius of the hole centered at a lower one of intersection points of the y-axis and the periphery of the hole, the semi-circle being located on an opposite side with respect to the y-axis in the direction in which the one of the first member and the second member is rotated relative to the other of the first member and the second member about said one point.

3. A method for inserting a first member having a cylindrical contour into a cylindrical stepped hole of a second member, the cylindrical stepped hole of the second member including a first hole portion having a diameter and a second hole portion having a diameter, the second hole diameter being larger than the first hole diameter, the second hole portion being located on an open end side of the first hole portion, said method comprising the steps of:

(a) inserting the first member into the second hole portion of the stepped hole of the second member and moving one of the first member and the second member relative to the other of the first member and the second member in a transverse direction of the stepped hole of the second member so that one of a side surface of the first member and an inside surface of the second hole portion of the second member contacts the other of the side surface of the first member and the inside surface of the second hole portion of the second member such that one of a center of a tip of the first member and a center of the first hole portion of the stepped hole of the second member is offset from the other of the center of the tip of the first member and the center of the first hole portion of the stepped hole of the second member;

(b) inclining one of the first member and the second member relative to the other of the first member and the second member by a small angle;

(c) moving one of the first member and the second member toward the other of the first member and the second member in an axial direction of the first hole portion of the stepped hole of the second member so that one of a periphery of the tip of the first member and a periphery of the open end of the first hole portion of the stepped hole of the second member contacts the other of the periphery of the tip of the first member and the periphery of the open end of the first hole portion of the stepped hole of the second member at one point, and biasing one of the first member and the second member against the other of the first member and the second member; and (d) rotating one of the first member and the second member relative to the other of the first member and the second member about said one point in a direction such that one of the center of the tip of the first member and the center of the first hole portion of the stepped hole of the second member approaches the other of the center of the tip of the first member and the center of the first hole portion of the stepped hole of the second member, until the first member is automatically inserted into the first hole portion of the stepped hole of the second member when the centers are substantially aligned.

4. A method according to claim 3, wherein a plane is defined that is perpendicular to an axis defined by the centers of the first and second hole portions, the plane containing an x axis and a y axis, both perpendicular to one another, the x axis being the axis about which said one of the first member and the second member is inclined relative to the other, the plane further containing a circle f' centered upon an origin which is the intersection of the x axis and y axis and having a diameter equal to a difference between the diameter of the first hole portion and the diameter of the second hole portion and, the plane further containing a semicircle b in the same quadrant where the first member contacts the second member, the semicircle b having the same radius as a radius of said first hole portion and being centered on the y axis where the y axis meets with the periphery of the first hole portion, the plane further containing a first straight line that is inclined 45 degrees with respect to the x axis and passes through the point where f' intersects with the y axis, and a second straight line which is parallel to the first straight line and passes through the intersection of the semicircle b and circle f' and further wherein during said inserting step, the first member is inserted into the second hole portion such that the center of the first member is located within an area surrounded by (a) the first straight line (b) the second straight line, and (c) the circle f'.

5. A method for selecting one method from a first insertion method and a second insertion method when inserting a first member having a cylindrical contour into a cylindrical stepped hole of a second member, the cylindrical stepped hole of the second member including a first hole portion having a diameter and a second hole portion having a diameter, the second hole diameter being larger than the first hole diameter, the second hole portion being located on an open end side of the first hole portion, wherein the first insertion method comprises the steps of:

(a) inclining one of the first member and the second member relative to the other of the first member and the second member by a small angle and offsetting one of a center of a tip of the first member and a center of the first hole portion of the stepped hole of the second member from the other of the center of the tip of the first member and the center of the first hole portion of the stepped hole of the second member;

(b) moving one of the first member and the second member toward the other of the first member and the second member in an axial direction of the first hole portion of the stepped hole of the second member so that one of a periphery of the tip of the first member and a periphery of the open end of the first hole portion of the stepped hole of the second member contacts the other of the periphery of the tip of the first member and the periphery of the open end of the first hole portion of the stepped hole of the second member at one point, and biasing one of the first member and the second member against the other of the first member and the second member; and (c) rotating one of the first member and the second member relative to the other of the first member and the second member about said one point in a direction such that one of the center of the tip of the first member and the center of the first hole portion of the stepped hole of the second member approaches the other of the center of the tip of the first member and the center of the first hole portion of the stepped hole of the second member, until the first member is automatically inserted into the first hole portion of the stepped hole of the second member when the centers are substantially aligned, and wherein said second insertion method comprises the steps of:

(a) inserting the first member into the second hole portion of the stepped hole of the second member and moving one of the first member and the second member relative to the other of the first member and the second member in a transverse direction of the stepped hole of the second member so that one of a side surface of the first member and an inside surface of the second hole portion of the second member contacts the other of the side surface of the first member and the inside surface of the second hole portion of the second member and so that one of the center of the tip of the first member and the center of the first hole portion of the stepped hole of the second member is offset from the other of the center of the tip of the first member and the center of the first hole portion of the stepped hole of the second member;

(b) inclining one of the first member and the second member relative to the other of the first member and the second member by a small angle;

(c) moving one of the first member and the second member toward the other of the first member and the second member in an axial direction of the first hole portion of the stepped hole of the second member so that one of the periphery of the tip of the first member and the periphery of the open end of the first hole portion of the stepped hole of the second member contacts the other of the periphery of the tip of the first member and the periphery of an open end of the first hole portion of the stepped hole of the second member at one point, and biasing one of the first member and the second member against the other of the first member and the second member; and (d) rotating one of the first member and the second member relative to the other of the first member and the second member about said one point in a direction such that one of the center of the tip of the first member and the center of the first hole portion of the stepped hole of the second member approaches the other of the center of the tip of the first member and the center of the first hole portion of the stepped hole of the second member, until the first member is automatically inserted into the first hole portion of the stepped hole of the second member when the centers are substantially aligned, said method for selecting one method from the first insertion method and the second insertion method comprising the steps of:

calculating a difference, Db-Da, in the diameters of the first hole portion and the second hole portion; and determining which method of said first method and said second method is to be selected based on said difference, Db-Da.

6. A method for selecting one method from a first insertion method and a second insertion method when inserting a first member having a cylindrical contour into a cylindrical stepped hole of a second member, the cylindrical stepped hole of the second member including a first hole portion having a diameter and a second hole portion having a diameter, the second hole diameter being larger than the first hole diameter, the second hole portion being located on an open end side of the first hole portion, wherein the first insertion method comprises the steps of:

(a) inclining one of the first member and the second member relative to the other of the first member and the second member by a small angle and of setting one of a center of a tip of the first member and a center of the first hole portion of the stepped hole of the second member from the other of the center of the tip of the first member and the center of the first hole portion of the stepped hole of the second member;

(b) moving one of the first member and the second member toward the other of the first member and the second member in an axial direction of the first hole portion of the stepped hole of the second member so that one of a periphery of the tip of the first member and a periphery of the open end of the first hole portion of the stepped hole of the second member contacts the other of the periphery of the tip of the first member and the periphery of the open end of the first hole portion of the stepped hole of the second member at one point, and biasing one of the first member and the second member against the other of the first member and the second member; and (c) rotating one of the first member and the second member relative to the other of the first member and the second member about said one point in a direction such that one of the center of the tip of the first member and the center of the first hole portion of the stepped hole of the second member approaches the other of the center of the tip of the first member and the center of the first hole portion of the stepped hole of the second member, until the first member is automatically inserted into the first hole portion of the stepped hole of the second member when the centers are substantially aligned, and wherein said second insertion method comprises the steps of:

(a) inserting the first member into the second hole portion of the stepped hole of the second member and moving one of the first member and the second member relative to the other of the first member and the second member in a transverse direction of the stepped hole of the second member so that one of a side surface of the first member and an inside surface of the second hole portion of the second member contacts the other of the side surface of the first member and the inside surface of the second hole portion of the second member and so that one of the center of the tip of the first member and the center of the first hole portion of the stepped hole of the second member is offset from the other of the center of the tip of the first member and the center of the first hole portion of the stepped hole of the second member;

(b) inclining one of the first member and the second member relative to the other of the first member and the second member by a small angle;

(c) moving one of the first member and the second member toward the other of the first member and the second member in an axial direction of the first hole portion of the stepped hole of the second member so that one of the periphery of the tip of the first member and the periphery of the open end of the first hole portion of the stepped hole of the second member contacts the other of the periphery of the tip of the first member and the periphery of an open end of the first hole portion of the stepped hole of the second member at one point, and biasing one of the first member and the second member against the other of the first member and the second member; and (d) rotating one of the first member and the second member relative to the other of the first member and the second member about said one point in a direction such that one of the center of the tip of the first member and the center of the first hole portion of the stepped hole of the second member approaches the other of the center of the tip of the first member and the center of the first hole portion of the stepped hole of the second member, until the first member is automatically inserted into the first hole portion of the stepped hole of the second member when the centers are substantially aligned, said method for selecting one method from the first insertion method and the second insertion method comprising the steps of:

calculating a difference, Db-Da, in the diameters of the first hole portion and the second hole portion;

determining a y axis with an origin at the center of said first hole portion and being perpendicular to an axis about which said one of the first member and the second member is inclined relative to the other;

determining a circular area f' which has a diameter of Db-Da and a center located at the center of said first hole portion;

determining semicircular area b where b has the same radius as a radius of said first hole portion and is centered on the y axis where the y axis meets with the periphery of the first hole portion;

determining an insertion capable area g' defined by a circle which is within the area defined by semicircular area b, the y-axis, and the circle f';

determining whether area g' is encompassed by circle $g_1$, wherein $g_1$ is determined by a positional tolerance of an insertion apparatus and has a center at a center of the first member in a state where one of the first member and the second member is not yet rotated relative to the other of the first member and the second member; and selecting said first insertion method if area g' is equal to or greater than circle $g_1$ and selecting said second insertion method if area g' is encompassed by circle $g_1$.

* * * * *